US009751390B2

(12) United States Patent
Roth et al.

(10) Patent No.: US 9,751,390 B2
(45) Date of Patent: Sep. 5, 2017

(54) BUS DOOR SEAL

(71) Applicant: LIPPERT COMPONENTS, INC., Elkhart, IN (US)

(72) Inventors: Bryan J. Roth, Topeka, IN (US); Michael J. Fiwek, Nappanee, IN (US); Jeffrey K. Albrecht, Goshen, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 0 days.

(21) Appl. No.: 15/234,079

(22) Filed: Aug. 11, 2016

(65) Prior Publication Data

US 2017/0050503 A1 Feb. 23, 2017

Related U.S. Application Data

(60) Provisional application No. 62/207,129, filed on Aug. 19, 2015.

(51) Int. Cl.
*B60J 10/08* (2006.01)
*B60J 10/40* (2016.01)
*B60J 10/248* (2016.01)

(52) U.S. Cl.
CPC ............. *B60J 10/40* (2016.02); *B60J 10/248* (2016.02)

(58) Field of Classification Search
CPC ... B60J 10/40; B60J 10/86; B60J 10/80; B60J 10/00; B60J 10/24; B60J 10/248; E06B 7/2312; E05Y 2900/51
See application file for complete search history.

(56) References Cited

U.S. PATENT DOCUMENTS

| | | | | | |
|---|---|---|---|---|---|
| 2,575,793 | A * | 11/1951 | Bush | E06B 7/232 | 29/897.312 |
| 2,912,727 | A * | 11/1959 | Sehn | B60J 10/80 | 49/371 |
| 3,161,925 | A * | 12/1964 | Bertolini | F16J 15/027 | 220/378 |
| 3,886,686 | A * | 6/1975 | Urbanick | E06B 7/2312 | 49/490.1 |
| 3,919,809 | A * | 11/1975 | Haughton | E05D 15/30 | 49/109 |
| 4,001,974 | A * | 1/1977 | Wright | E06B 7/2312 | 428/122 |
| 4,015,368 | A * | 4/1977 | Court | E04F 21/00 | 49/368 |
| 4,045,631 | A * | 8/1977 | Dann | H01H 3/142 | 200/61.43 |
| 4,051,336 | A * | 9/1977 | Miller | B60J 10/00 | 200/61.43 |
| 4,133,365 | A * | 1/1979 | Schleicher | H01H 3/24 | 160/118 |
| 4,349,710 | A * | 9/1982 | Miller | H01H 3/142 | 200/245 |
| 5,332,279 | A * | 7/1994 | Golemis | B60J 5/0497 | 192/69.6 |

(Continued)

*Primary Examiner* — Justin Rephann
(74) *Attorney, Agent, or Firm* — Barnes & Thornburg LLP

(57) ABSTRACT

A seal system for a bi-fold door having a first panel and second panel includes a first seal attachable to the first panel and a second seal attachable to the second panel. Each seal includes a mounting portion, a bulb portion, and a flap portion. When the bi-fold door is closed, the flap portion of the first seal overlies the second seal, and the flap portion of the second seal overlies the first seal.

20 Claims, 5 Drawing Sheets

(56) References Cited

U.S. PATENT DOCUMENTS

| | | | | | |
|---|---|---|---|---|---|
| 5,499,475 | A * | 3/1996 | Court | E06B 7/2312 | 49/368 |
| 6,158,171 | A * | 12/2000 | Kellogg | E06B 7/2303 | 49/475.1 |
| 6,478,308 | B1 * | 11/2002 | McMillin | B60J 10/86 | 277/630 |
| 6,527,278 | B1 * | 3/2003 | Norris | E06B 7/2301 | 277/628 |
| 6,920,908 | B2 * | 7/2005 | Niehausmever | E05D 15/26 | 160/118 |
| 6,997,230 | B2 * | 2/2006 | Niehausmeier | E05D 5/0238 | 160/118 |
| 8,839,564 | B2 * | 9/2014 | Happel | E06B 7/2307 | 49/368 |
| 2011/0011004 | A1 * | 1/2011 | Courrian | B61D 19/026 | 49/483.1 |
| 2012/0023829 | A1 * | 2/2012 | Happel | E06B 7/2307 | 49/479.1 |
| 2014/0360101 | A1 * | 12/2014 | Whiting, Jr. | E06B 7/2312 | 49/490.1 |
| 2015/0082705 | A1 * | 3/2015 | Kaczmarczyk | E06B 7/2309 | 49/368 |
| 2016/0137043 | A1 * | 5/2016 | Baba | B60J 10/277 | 49/483.1 |

* cited by examiner 118
120
134
114
164
116
162
158
156
160
110
142

118
122
120
136
124
124
142
140
138
148
144
114
146
150A
150B
152
116
126
154
130
128
132
110
112

BUS DOOR SEAL

CROSS-REFERENCE TO RELATED APPLICATIONS

This application claims benefit under 35 U.S.C. §119 of U.S. Provisional Patent Application No. 62/207,129, filed on Aug. 19, 2015, and incorporates by reference the disclosure thereof in its entirety.

BACKGROUND AND SUMMARY OF THE DISCLOSURE

A passenger bus may include at least one set of bi-fold doors. One set of such doors typically may be found in an entryway near the front of the bus, opposite the driver's seat. A second set may be found in an entryway towards the rear of the bus. Each set of doors includes a forward door and a rearward door. The forward door is configured to rotate outwardly about hinges at or near its leading edge. The rearward door is configured to rotate outwardly about hinges at or near its trailing edge. The bottoms of the doors typically terminate at or near and, when closed, overlie an interior floor of the bus or an interior step of the bus.

DETAILED DESCRIPTION OF THE DRAWINGS

Figure 1:
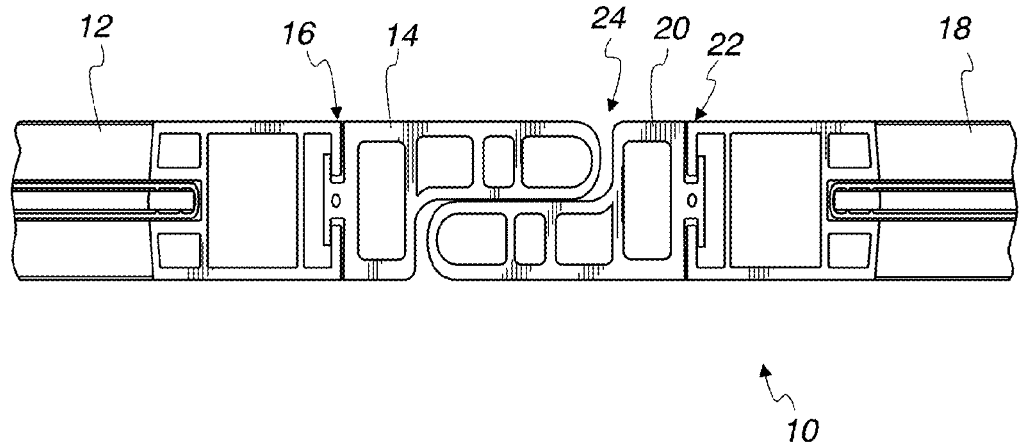
FIG. 1 is a top plan view of an illustrative conventional bus door system including trailing and leading edge door seals arranged to overlap in a conventional manner.

FIG. 1 is a top plan view of a portion of an illustrative conventional bus door system 10 including a portion of a first or forward door or panel 12, a first or forward door seal 14 attached to a trailing edge 16 of the forward door, a portion of a second or rearward door or panel 18, and a second or rearward door seal 20 attached to a leading edge 22 of the rearward door. The forward door seal 14 and the rearward door seal 20 may extend along the entire height of the respective forward and rearward doors 12, 18 or to a greater or lesser extent.

FIG. 1 shows the doors 12, 18 in the closed position. With the doors 12, 18 in the closed position a portion of the forward door seal 14 overlaps a portion of the rearward door seal 20, thereby defining a gap 24 between the forward door seal and the rearward door seal. The gap 24 may extend the entire height of the interface between the forward door seal 14 and the rearward door seal 20. Water, for example, rain water or road spray, can infiltrate the gap 24, migrate to an inner portion of the gap, and pool on the floor or step at the bottom of the door system 10.

Figure 2:
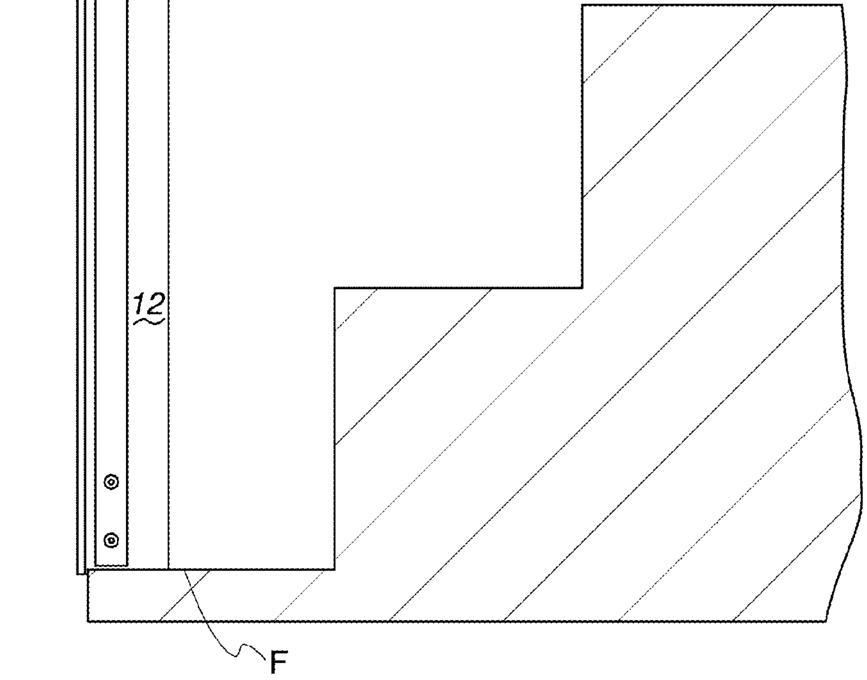
FIG. 2 is a side elevation view of the bus door system of FIG. 1 installed in an entryway of a bus.

FIG. 2 shows the system 10 installed in an entryway of a bus with the doors 12, 18 in a closed position and overlying a floor F of an interior step of the entryway of the bus.

FIGS. 3-7 show an illustrative bus door system 110 according to the present disclosure. The bus door system 110 may be installed in an entryway of a bus or other vehicle or structure in a manner similar to that shown in FIG. 2. The bus door system 110 includes a first or forward door or panel 112 having a first thickness, a first or forward door seal 114 attached to a trailing edge 116 of the forward door, a second or rearward door or panel 118 having a second thickness, and a second or rearward door seal 120 attached to a leading edge 122 of the rearward door. The forward door seal 114 and the rearward door seal 120 may extend along the entire height of the respective forward and rearward doors 112, 118 or to a greater or lesser extent.

Figure 4:
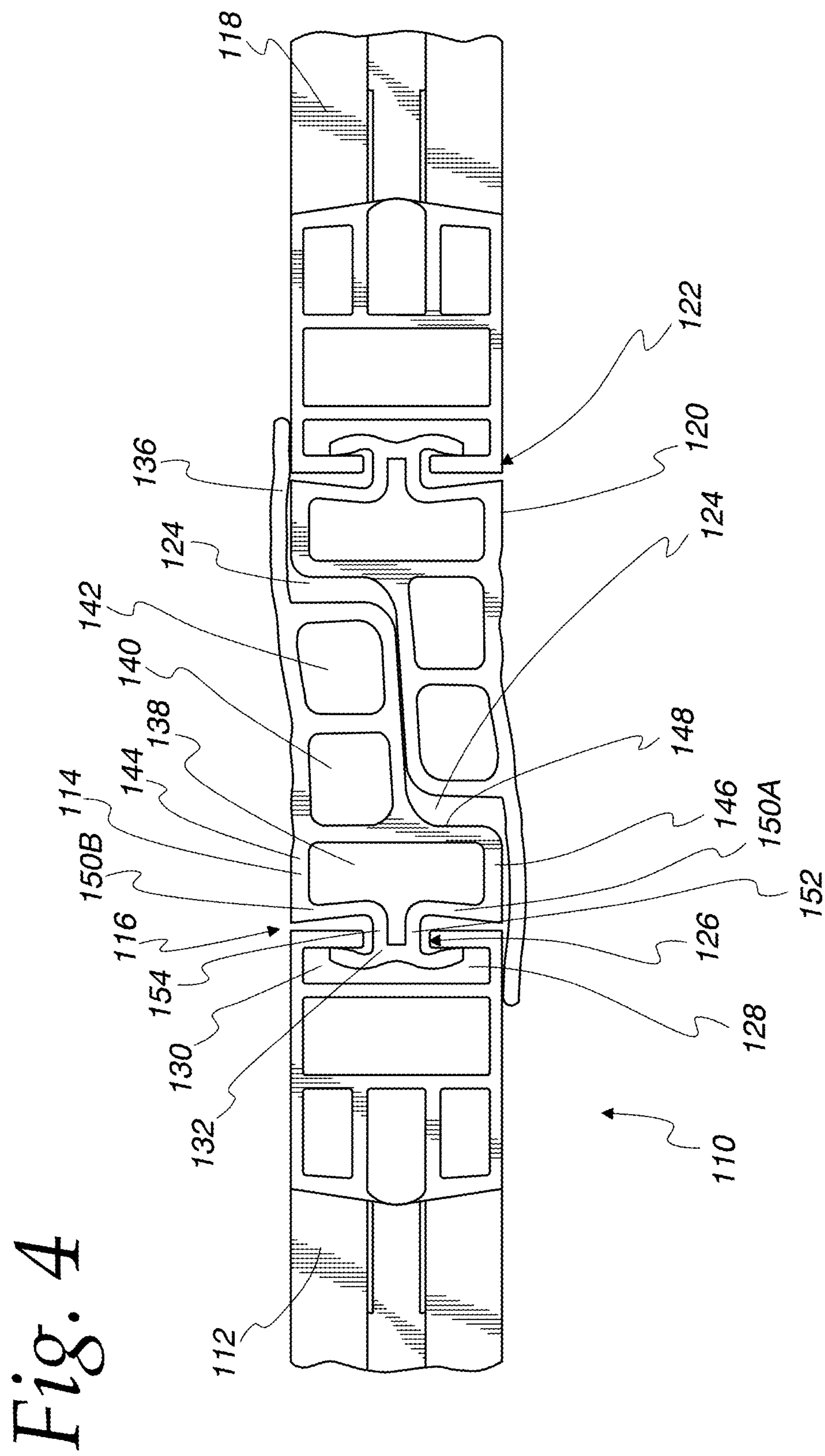
FIG. 4 is a top plan view of an illustrative bus door and seal arrangement according to the present disclosure with the doors in a closed position.
Figure 5:
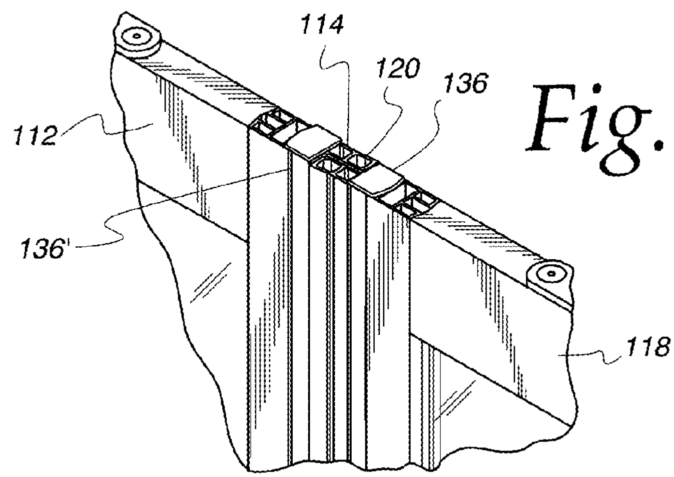
FIG. 5 is a perspective view of a portion of an illustrative bus door and seal arrangement according to the present disclosure with the doors in a closed position.
Figure 6:
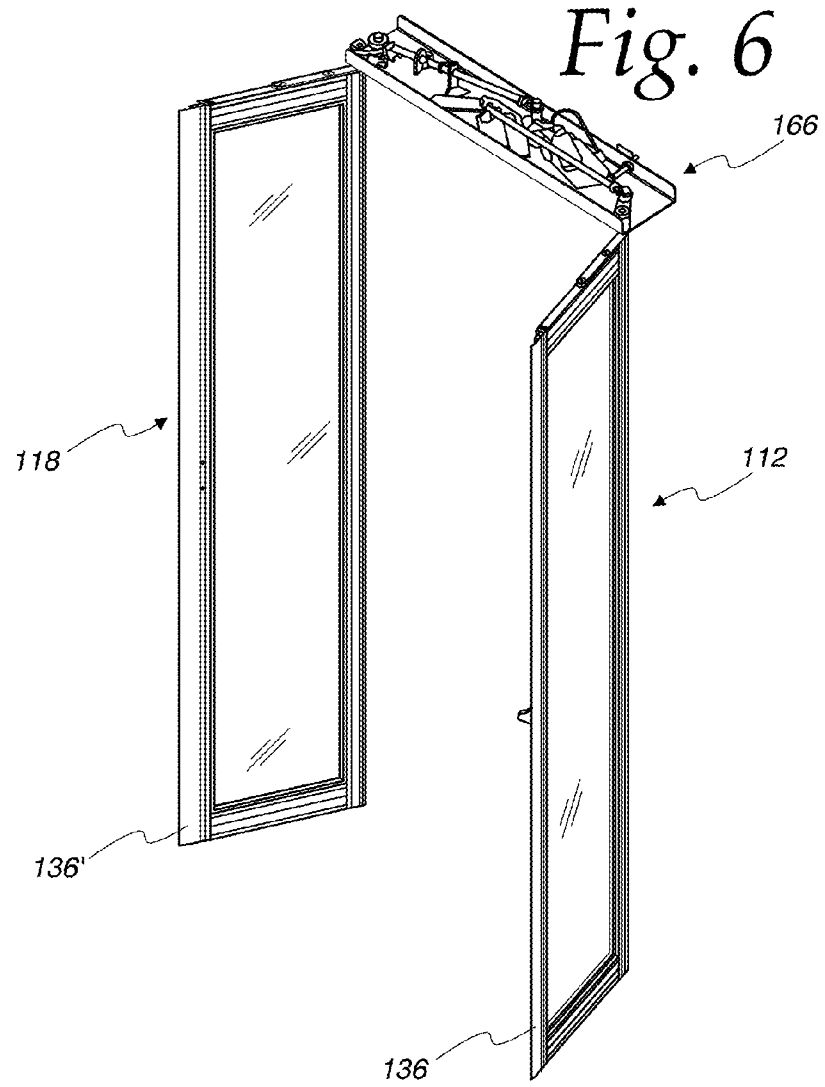
FIG. 6 is a perspective view of an illustrative bus door and seal arrangement according to the present disclosure with the doors in an open position.
Figure 7:
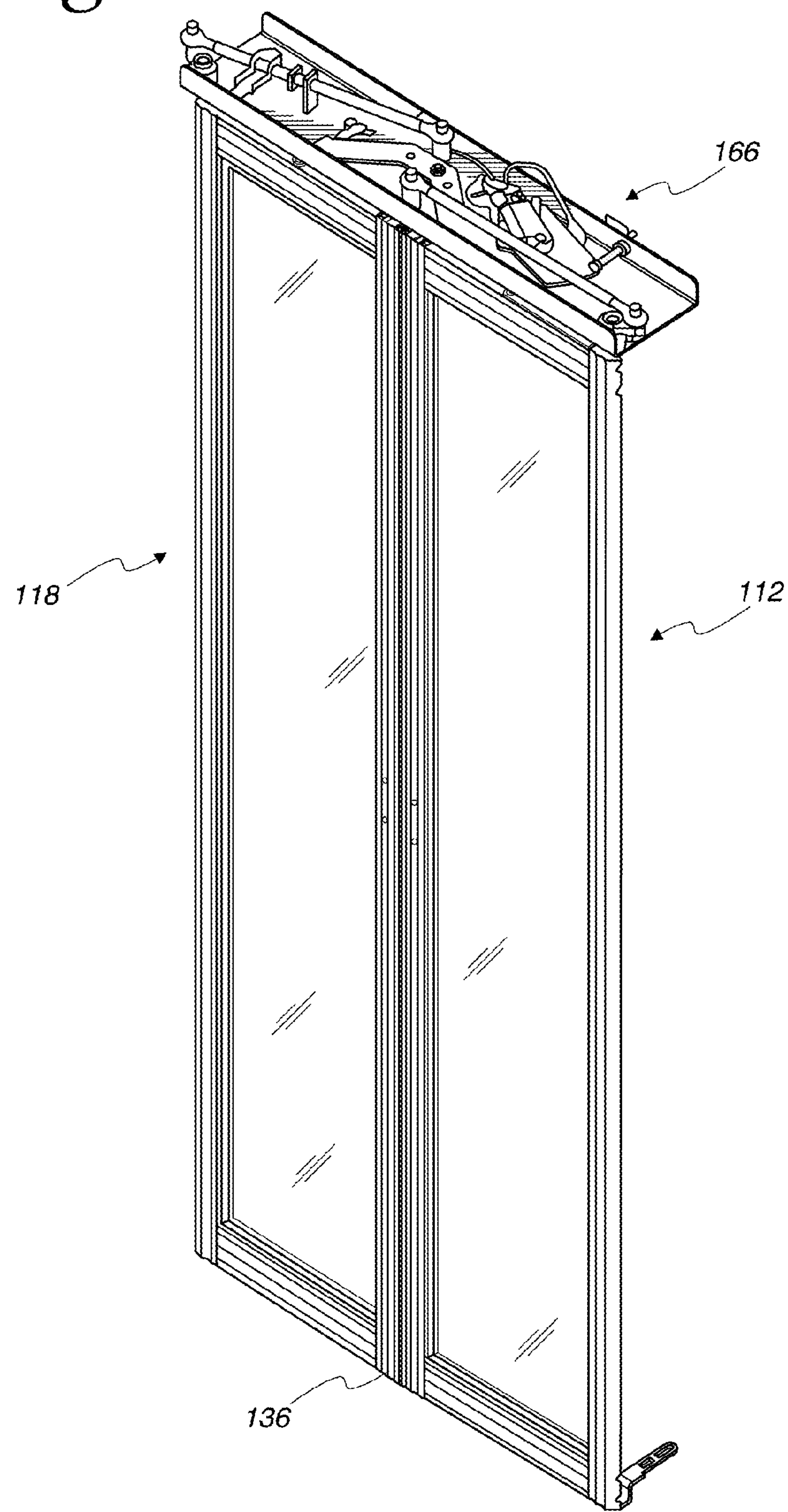
FIG. 7 is a perspective view of an illustrative bus door and seal arrangement according to the present disclosure with the doors in a closed position.

The first door 112 may rotate or pivot about a first pivot axis (which may be embodied as one or more hinges or other pivotal connections). Similarly, the second door 118 may rotate or pivot about a second pivot axis (which may be embodied as one or more hinges or other pivotal connections). The first and second pivot axes may be spaced apart from and parallel to each other. Typically, both the first door 112 and the second door 118 would be configured to rotate outwardly from a first or closed position (as shown in FIG. 4). In other embodiments, either or both of the first and second doors 112, 118 could rotate inwardly from the closed position.

One or more linkages (not shown) may be provided to operate the first and second doors 112, 118. The linkage may interconnect the first and second doors 112, 118. In an embodiment, one of the first and second doors 112, 118 may be a fixed panel. The linkage may be configured to begin pivoting the first panel from the first panel first position toward the first panel second position before beginning to pivot the second panel from the second panel first position toward the second panel second position, and to complete pivoting the second panel from the second panel second position to the second panel first position before completing the pivoting of the first panel from the first panel second position to the first panel first position.

Figure 3:
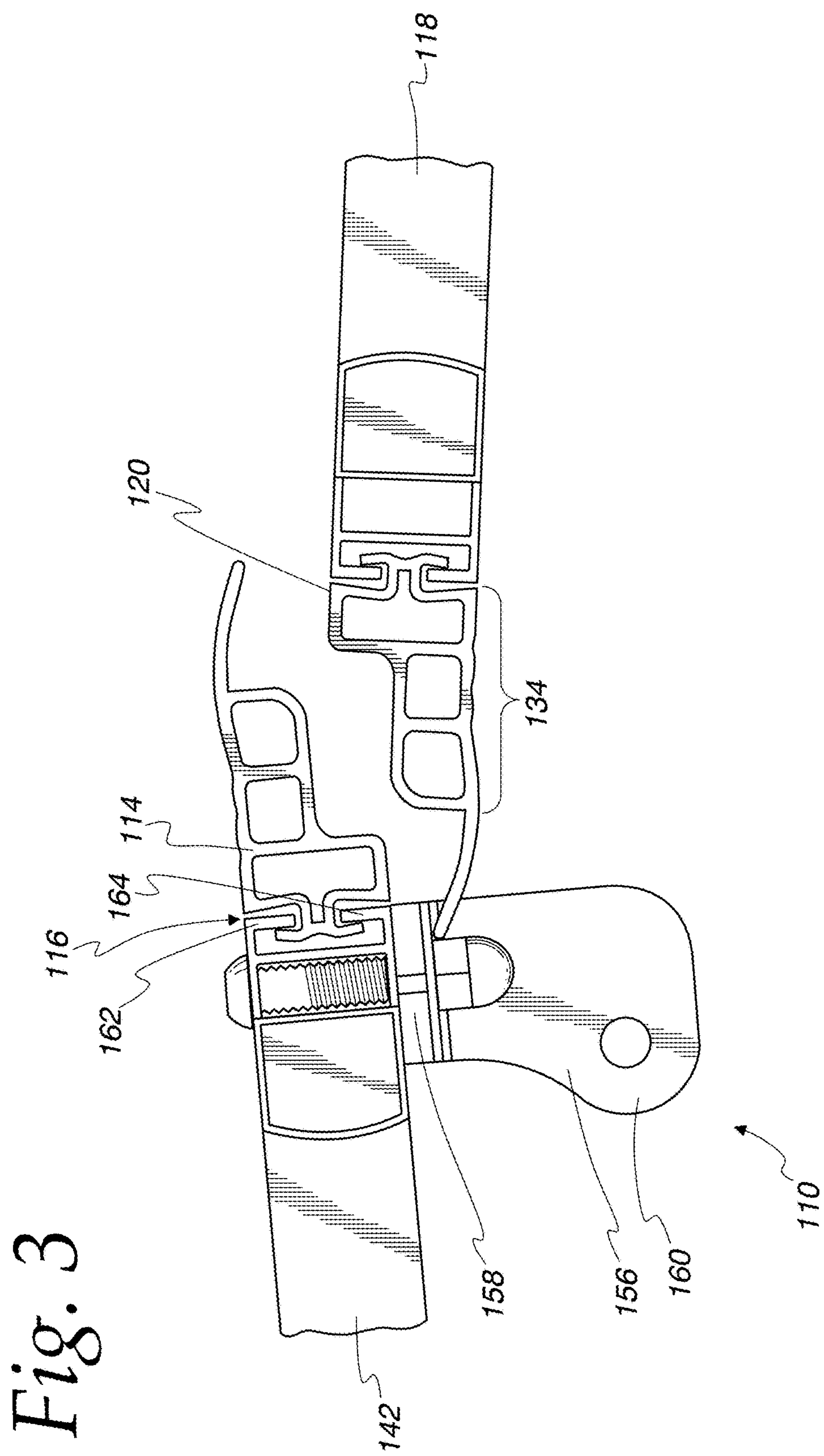
FIG. 3 is a top plan view of an illustrative bus door and seal arrangement according to the present disclosure with the doors in an open position.

FIG. 3 shows the doors 112, 118 in a partially opened position such that the forward door seal 114 and the rearward door seal 120 are not in contact (or engaged) with each other. FIG. 4 shows the doors 112, 118 in a closed position such that the forward door seal 114 and the rearward door seal 120 are engaged with each other. With the doors 112, 118 in the closed position, a portion of the forward door seal 114 overlaps a portion of the rearward door seal 120, thereby defining a gap 124. The gap 124 is covered by a flap 136 of the forward door seal 112, as will be discussed further below.

The trailing edge 116 of the forward door 112 defines a slot 126 extending the height of the door or a portion thereof. The slot 126 cooperates with an interior portion 128 of the forward door 112 to define a generally T-shaped channel 130 configured to receive a mounting portion of the forward door seal, as will be discussed further below.

The forward door seal 114 includes a mounting portion 132 and a bulb seal portion 134 connected to and extending from the mounting portion. The flap 136 is connected to and extends from the bulb seal portion 134. The mounting portion 132 has a generally T-shaped cross-section that generally complements the T-shaped cross-section of the channel 130, as shown in FIGS. 3 and 4. As such, the channel 130 of the forward door 112 is configured to receive the mounting portion 132 of the forward door seal 114. In an embodiment, the mounting portion 132 of the forward door seal may be slidingly inserted into the channel 130 of the forward door 112 through an open end thereof, for example, the end shown in FIGS. 3 and 4.

The bulb seal portion 134 of the forward door seal 114 is shown as comprising a plurality of sidewalls configured to define a first bulb 138, a second bulb 140, and a third bulb 142. In other embodiments, the seal bulb portion 134 could be configured to define more or fewer bulbs.

The first bulb 138 extends from the mounting portion 132. The first bulb 138 has a generally rectangular cross-section having first and second relatively short sidewalls 144, 146 and third and fourth relatively long sidewalls 148, 150. The first and second sidewalls 144, 146 are connected to first and second ends, respectively, of the third and fourth sidewalls 148, 150 at substantially right angles, thereby forming a generally rectangular bulb. The fourth sidewall 150 is embodied as first and second wall sections 150A, 150B. The first and second wall sections 150A, 150B have ends that approach each other but do not connect. Instead, a fifth sidewall 152 extends outwardly from the first wall section 150A, and a sixth sidewall 154 extends outwardly from the second wall section 150B. The fifth and sixth sidewalls 152, 154 are generally parallel to and spaced apart from each other, defining a space there between. Each of the fifth and sixth sidewalls 152, 154 is connected to a flange defining the mounting portion 132. The first bulb 138 has a first dimension (or length) about equal to the thickness of the door and a second dimension (or width) about half of the first dimension. In other embodiments, the first dimension could be greater or less than the thickness of the door, and the second dimension could be a different function of the first dimension.

The second bulb 140 extends from the first bulb 138. The second bulb 140 has a generally square cross section having first and second dimensions about half the first dimension of the first bulb 138.

The third bulb 142 extends from the second bulb 140. The third bulb 142 has a generally square cross section with dimensions similar to the dimensions of the second bulb 140. The third bulb 142 differs from the second bulb 140 in that the third bulb has three generally square, chamfered corners and one rounded corner, whereas the second bulb has four generally square, chamfered corners.

In other embodiments, the bulb seal portion 134 of the forward door seal 114 may include more or fewer bulbs, and the bulbs may have different configurations.

The flap 136 extends from an outer portion of the bulb portion 134 proximate the third bulb 142. The flap 136, when in a relaxed state in which the flap is not in contact with another structure, may arc inwardly from its point of connection to the bulb portion 134.

As best shown in FIGS. 3 and 4, the free ends of the mounting portion 132 may curve toward and contact flanges 162 and 164 defining the slot 126 at the rear edge of the forward door 112. Also, the outer ends of the first and second wall sections 150A, 150B may curve toward and contact the flanges 162 and 164. As such, the free ends of the mounting portion 132 and the outer ends of the first and second wall sections 150A, 150B may cooperate to "grip" the flanges 162 and 164 when the forward seal 114 is installed to the forward door 112.

The leading edge 122 of the rearward door may be configured in a manner similar to the trailing edge 116 of the forward door 112 and will not be described in further detail.

The rearward door seal 120 may be configured in a manner similar to the forward door seal 114 and will not be described in further detail.

With the doors 112, 118 in the closed position, as shown in FIG. 4, the second and third bulbs 140, 142 of the forward door seal 114 overlie the corresponding second and third bulbs of the rearward door seal 120. Also, the flap 136 of the forward door seal 114 overlies the first bulb of the rearward door seal 120. The flap 136 of the forward door seal may further overlie a leading portion of the outer surface of the rearward door 118. Similarly, the flap of the rearward door seal 120 overlies the first bulb 138 of the forward door seal 114, and it may further overlie a leading portion of the inner surface of the forward door 112. As such, the flap 136 covers gaps 124 otherwise defined by the forward door seal 114 and the rearward door seal 120. Although not shown as such in FIG. 4, the flap 136 of the forward door seal 114 may lie flat against the rearward door seal 120 and/or the rearward door 118, and the flap 136 of the rearward door seal 120 may lie flat against the forward door seal 114 and/or the forward door 112.

With the doors 112, 118 closed and the flap 136 of the forward door seal 114 configured as described above, the interface between the flap of the forward door seal and the rearward door 118 and rearward door seal 120 precludes or mitigates intrusion of water and the like inboard of the forward door seal 114, and thereby into the interior of the vehicle.

FIG. 3 shows a generally L-shaped bracket 156 having a first leg 158 attached to the forward door 112 by means of a threaded fastener and a second leg 160 defining an aperture. The aperture is configured to receive, for example, a hooked end of an actuator rod that could be operated remotely to open and close the door.

The foregoing embodiments are illustrative and not limiting. Elements of a given embodiment may be included in other embodiments to the greatest possible extent.

The invention claimed is:

1. A system comprising:

a first panel having a first panel thickness, a first panel leading edge and a first panel trailing edge, the first panel pivotally mounted on a first pivot axis proximate the first panel leading edge;

a second panel having a second panel thickness, a second panel leading edge and a second panel trailing edge, the second panel pivotally mounted on a second pivot axis proximate the second panel trailing edge, the second pivot axis parallel to and spaced from the first pivot axis;

the first panel and the second panel pivotally operable between first positions in which the first panel is generally co-planar with the second panel and the first panel trailing edge is generally adjacent to the second panel leading edge, and second positions in which the first panel is not substantially coplanar with the second panel;

a first seal attached to the trailing edge of the first panel, the first seal comprising:

a first seal mounting portion;

a first seal bulb portion; and a first seal flap portion; wherein the first seal flap portion extends from the first seal bulb portion;

a second seal attached to the leading edge of the second panel, the second seal comprising:

a second seal mounting portion;

a second seal bulb portion; and a second seal flap portion; wherein the second seal flap portion extends from the second seal bulb portion;

wherein the first seal bulb portion abuts the second seal bulb portion, the first seal flap portion overlies the second seal, and the second seal flap portion overlies the first seal when the first panel and the second panel are in the first positions.

2. The system of claim 1 further comprising a linkage connecting the first panel and the second panel, the linkage configured to pivot the first panel and the second panel between the first positions and the second positions, the linkage further configured to begin pivoting the first panel from the first panel first position toward the first panel second position before beginning to pivot the second panel from the second panel first position toward the second panel second position, and to complete pivoting the second panel from the second panel second position to the second panel first position before completing the pivoting of the first panel from the first panel second position to the first panel first position.

3. The system of claim 1, the first pivot axis fixed with respect to the second pivot axis.

4. The system of claim 1, the first seal bulb portion comprising a first bulb and a second bulb adjacent the first bulb.

5. The system of claim 4, the second bulb of the first seal bulb portion overlying and abutting the second seal bulb portion when the first panel and the second panel are in the first positions.

6. The system of claim 5, the second seal flap portion overlying the first bulb of the first seal bulb portion when the first panel and the second panel are in the first positions.

7. The system of claim 6, the second seal bulb portion comprising a first bulb and a second bulb.

8. The system of claim 7, the second bulb of the first seal bulb portion overlying and abutting the second bulb of the second seal bulb portion when the first panel and the second panel are in the first positions.

9. The system of claim 8, the first seal flap portion overlying the first bulb of the second seal bulb portion when the first panel and the second panel are in the first positions.

10. The system of claim 9 wherein the first bulb of the first seal bulb portion has a thickness substantially equal to the first panel thickness and the first bulb of the second seal bulb portion has a thickness substantially equal to the second panel thickness.

11. The system of claim 10 wherein the second bulb of the first seal bulb portion has a thickness of substantially half the first panel thickness.

12. The system of claim 11 wherein the first panel thickness is substantially equal to the second panel thickness.

13. The system of claim 1, the trailing edge of the first panel defining a slot, the first panel defining a channel adjacent the slot, the first seal mounting portion engaged with the slot and the channel.

14. The system of claim 13, the first seal mount portion comprising a T-shaped member engaged with the slot and the channel.

15. The system of claim 1, the first seal bulb portion connected between the first seal mounting portion and the first seal flap portion.

16. The system of claim 1 wherein the first panel and the second panel are substantially parallel when the first panel and the second panel are in the second positions.

17. The system of claim 1 wherein the first seal flap portion further overlies the second panel when the first panel and the second panel are in the first positions.

18. A door and seal system comprising:

a first door panel having a first door panel thickness, a first door panel leading edge and a first door panel trailing edge, the first door panel pivotally mounted on a first pivot axis proximate the first door panel leading edge;

a second door panel having a second door panel thickness, a second door panel leading edge and a second door panel trailing edge, the second door panel pivotally mounted on a second pivot axis proximate the second door panel trailing edge, the second pivot axis parallel to, spaced from, and fixed with respect to the first pivot axis;

the first door panel and the second door panel pivotally operable between first positions in which the first door panel is generally co-planar with the second door panel and the first door panel trailing edge is generally adjacent to the second door panel leading edge, and second positions in which the first door panel is not substantially coplanar with the second door panel;

a first seal attached to the trailing edge of the first door panel, the first seal comprising:

a first seal mounting portion;

a first seal bulb portion having a first bulb and a second bulb; and a first seal flap portion; wherein the first seal flap portion extends from the first seal bulb portion;

a second seal attached to the leading edge of the second panel, the second seal comprising:

a second seal mounting portion;

a second seal bulb portion having a first bulb and a second bulb; and a second seal flap portion; wherein the second seal flap portion extends from the second seal bulb portion;

wherein the second bulb of the first seal bulb portion abuts and overlies the second bulb of the second seal bulb portion, the first seal flap portion overlies the second panel and the first bulb of the second seal bulb portion, and the second seal flap portion overlies the first panel and the first bulb of the first seal bulb portion when the first panel and the second panel are in the first positions.

19. The system of claim 18 further comprising a linkage connecting the first door panel and the second door panel, the linkage configured to pivot the first door panel and the second door panel between the first positions and the second positions, the linkage further configured to pivot the first door panel from the first door panel first position to the first door panel second position before pivoting the second door panel from the second door panel first position to the second door panel second position, and to pivot the second door panel from the second door panel second position to the second door panel first position before pivoting the first door panel from the first door panel second position to the first panel door first position.

20. The system of claim 19 wherein the first panel and the second panel are substantially parallel when the first panel and the second panel are in the second positions.

* * * * *